United States Patent
Niakan et al.

(10) Patent No.: US 11,236,713 B2
(45) Date of Patent: Feb. 1, 2022

(54) SEALED INTAKE AIR SYSTEM

(71) Applicant: Advanced Flow Engineering, Inc., Corona, CA (US)

(72) Inventors: Shahriar Nick Niakan, Corona, CA (US); George R. Chiang, Corona, CA (US)

(73) Assignee: Advanced Flow Engineering, Inc., Corona, CA (US)

( * ) Notice: Subject to any disclaimer, the term of this patent is extended or adjusted under 35 U.S.C. 154(b) by 276 days.

(21) Appl. No.: 16/510,357

(22) Filed: Jul. 12, 2019

(65) Prior Publication Data

US 2020/0025162 A1  Jan. 23, 2020

Related U.S. Application Data

(60) Provisional application No. 62/697,219, filed on Jul. 12, 2018.

(51) Int. Cl.
| | |
|---|---|
| *B01D 46/00* | (2006.01) |
| *F02M 35/02* | (2006.01) |
| *F02M 35/024* | (2006.01) |
| *B01D 46/52* | (2006.01) |
| *F02M 35/10* | (2006.01) |

(52) U.S. Cl.
CPC ... *F02M 35/02416* (2013.01); *B01D 46/0005* (2013.01); *B01D 46/0012* (2013.01); *B01D 46/521* (2013.01); *F02M 35/0203* (2013.01); *F02M 35/0204* (2013.01); *F02M 35/0209* (2013.01); *F02M 35/0245* (2013.01); *B01D 2265/02* (2013.01); *B01D 2277/20* (2013.01); *B01D 2279/60* (2013.01); *F02M 35/10321* (2013.01)

(58) Field of Classification Search
CPC .............. B01D 46/521; B01D 46/0012; B01D 46/0005; B01D 46/2414; B01D 2279/60; B01D 2265/028; B01D 2265/02; B01D 2277/20; B01D 2275/201; B01D 2275/208; F02M 35/02416; F02M 35/0203; F02M 35/0204; F02M 35/0209; F02M 35/0245; F02M 35/10321
USPC .............. 55/319, 385.3; 123/198 E; 181/206
See application file for complete search history.

(56) References Cited

U.S. PATENT DOCUMENTS

| | | | | |
|---|---|---|---|---|
| 7,631,726 B2* | 12/2009 | McWilliam | ........ | F02M 35/1211 181/206 |
| 7,645,329 B2* | 1/2010 | Niakan | .............. | B01D 53/0415 96/134 |
| 8,377,161 B2* | 2/2013 | Lee | ..................... | F02M 35/0204 55/385.3 |
| 8,535,403 B2* | 9/2013 | Patwardhan | ....... | B01D 46/4227 55/385.3 |
| 9,211,492 B2* | 12/2015 | Martin | ................ | C04B 38/0006 |
| 9,534,570 B2* | 1/2017 | Desjardins | ......... | F02M 35/0204 |
| 10,316,805 B2* | 6/2019 | Williams | ......... | F02M 35/10144 |
| 10,661,215 B2* | 5/2020 | Williams | ........... | B01D 46/0001 |
| 10,662,907 B2* | 5/2020 | Dirnberger | ....... | F02M 35/10262 |
| 10,954,901 B2* | 3/2021 | Kimura | ........... | F02M 35/10347 |

(Continued)

*Primary Examiner* — Minh Chau T Pham
(74) *Attorney, Agent, or Firm* — Crockett & Crockett, PC; K. David Crockett, Esq.; Niky Economy Syrengelas, Esq.

(57) ABSTRACT

A sealed intake air system incorporates a positive connection seal interface between the air filter and the airbox with captive fasteners to provide a positive connection between the air filter and the one-piece airbox.

5 Claims, 5 Drawing Sheets

(56) References Cited

U.S. PATENT DOCUMENTS

| | | | | |
|---|---|---|---|---|
| 2003/0029144 A1* | 2/2003 | Bergami | .......... | F02M 35/02483 |
| | | | | 55/319 |
| 2004/0031247 A1* | 2/2004 | Darnell | ............ | F02M 35/10013 |
| | | | | 55/319 |
| 2007/0289268 A1* | 12/2007 | Smith | .................. | F02M 35/116 |
| | | | | 55/385.3 |
| 2008/0209871 A1* | 9/2008 | German | ............. | B01D 46/0001 |
| | | | | 55/385.3 |
| 2008/0289305 A1* | 11/2008 | Girondi | ............ | F02M 35/02483 |
| | | | | 55/385.3 |
| 2009/0084344 A1* | 4/2009 | Fasan | ................... | F02M 35/024 |
| | | | | 123/198 E |
| 2009/0282793 A1* | 11/2009 | Tomlin | ............ | F02M 35/10144 |
| | | | | 55/385.3 |
| 2011/0067574 A1* | 3/2011 | Walz | ............... | F02M 35/10137 |
| | | | | 96/422 |

* cited by examiner

SEALED INTAKE AIR SYSTEM

This application claims priority to U.S. Provisional Application 62/697,219, filed Jul. 12, 2018.

FIELD OF THE INVENTIONS

The inventions described below relate to the field of sealed air intake systems for internal combustion engines.

BACKGROUND OF THE INVENTIONS

Conventional air filter systems often employ complicated geometry to trap the air filter element in the air flow path and they often require a host of other parts to keep the air filter in place and to isolate the air filter from power-robbing engine heat.

SUMMARY

The sealed intake air system incorporates a positive connection seal interface between the air filter and the airbox with captive fasteners to provide a positive connection between the air filter and the one-piece airbox. The air filter is formed around a rigid, molded base with a flange that engages a mating surface in the airbox.

DETAILED DESCRIPTION OF THE INVENTIONS

Figure 1:
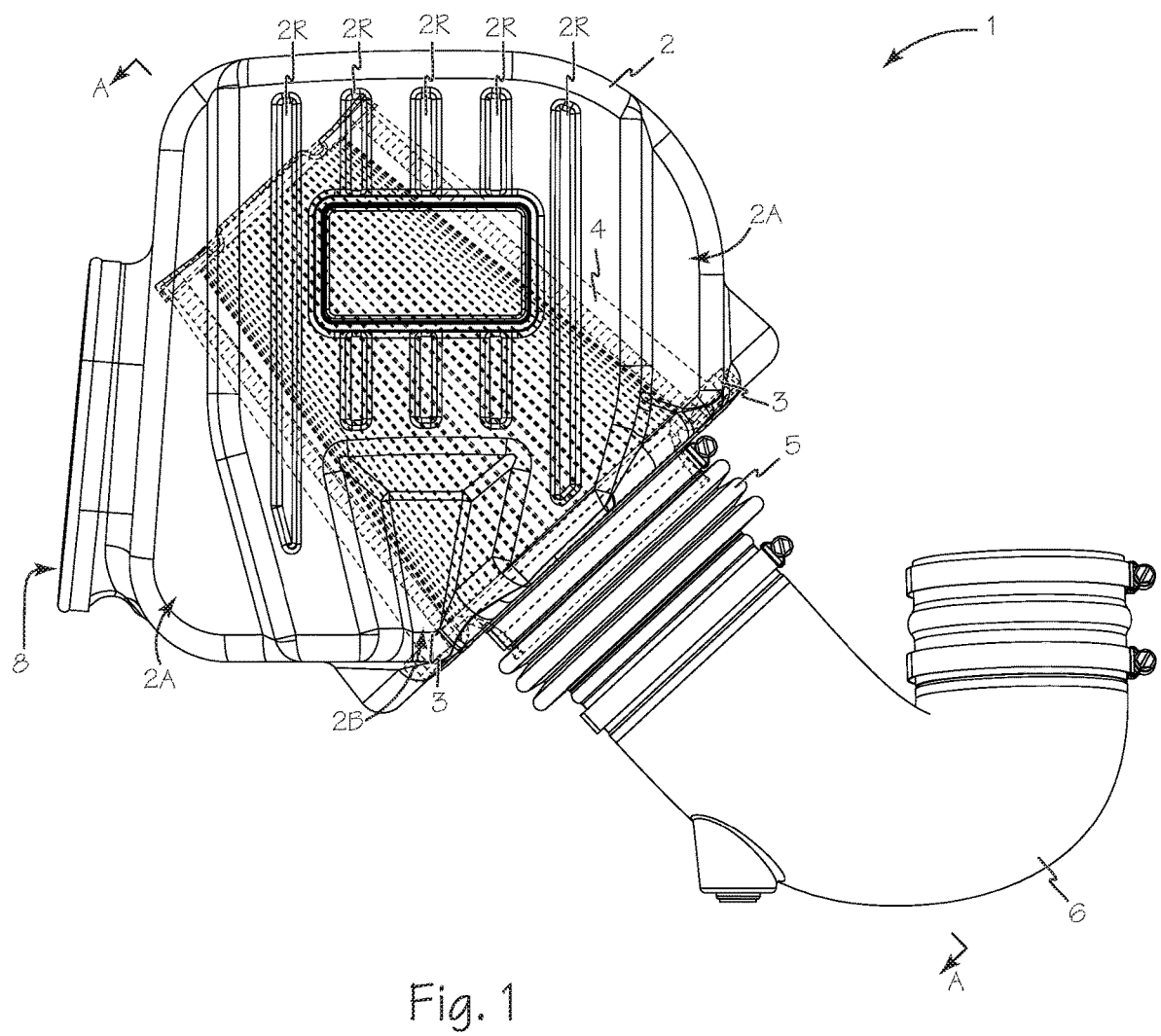
FIG. 1 is a top view of a sealed intake air system.
Figure 2:
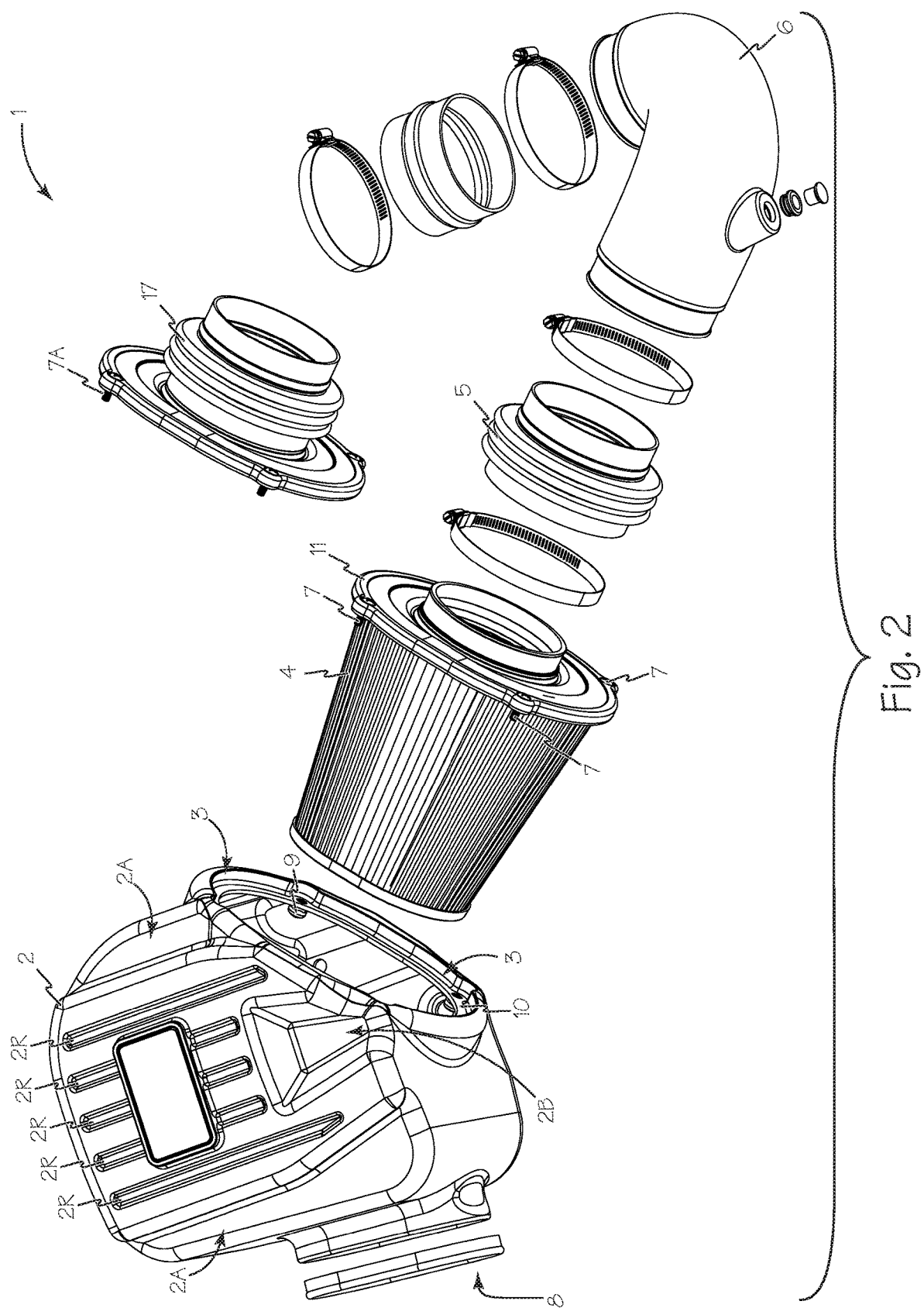
FIG. 2 is an exploded view of the sealed intake air system of FIG. 1.

The sealed air intake system 1 is illustrated in FIGS. 1 and 2. The sealed air intake system 1 incorporates a one-piece airbox 2 with a filter interface 3 for achieving a secure seal with the air filter 4. A bellows coupler 5 is generally connected between the air filter 4 and intake tube 6. Alternately, there may be one or more elements such as a straight coupler between the air filter base 11 and the bellows coupler 5. Intake tube 6 conducts clean filtered air to the air input for any suitable internal combustion engine. The bellows coupler 5 is generally formed of injected silicone and any other suitable material may be used such as polyurethane, plastisol, etc. Airbox 2 incorporates a unique 5-rib design with ribs 2R that make the airbox readily identifiable. In addition there may be included additional optional contoured features such as features 2A that are generally parallel to the outer ribs and contoured feature 2B that adjoins the three middle ribs.

As illustrated in FIG. 2, air filter 4 is secured to airbox 2 at interface 3 using a suitable number of captive connectors 7 such as screws, Dzus® fasteners, studs and nuts, plastic retaining clips, etc. Alternatively, the air filter may be secured to the airbox using double sided tape, adhesives or hook and loop fasteners. The airbox is preferably a one-piece sealed housing with at least one intake such as opening 8 that can be trimmed to adjust the size of the opening 8. Additional optional openings in the airbox will allow for extra air flow to reach the air filter 4.

Optionally, the air filter base 11 may be formed together with the bellows coupler 5 as integrated filter base 17 illustrated in FIG. 2. Integrated filter base 17 may be formed of any suitable compliant material. When integrated filter base 17 is used, connectors 7A should have shoulders to control compression of the filter flange.

Any suitable inserts 9 may be molded into the airbox to engage the captive fasteners 7 from the filter providing a positive connection of the filter to the airbox without the need for any additional hardware. The inserts can be made of brass or any other suitable materials and can be threaded or non-threaded (press fit, insert clips, etc. may be used). The inserts may or may not be used depending upon the attachment type selected.

Figure 3:
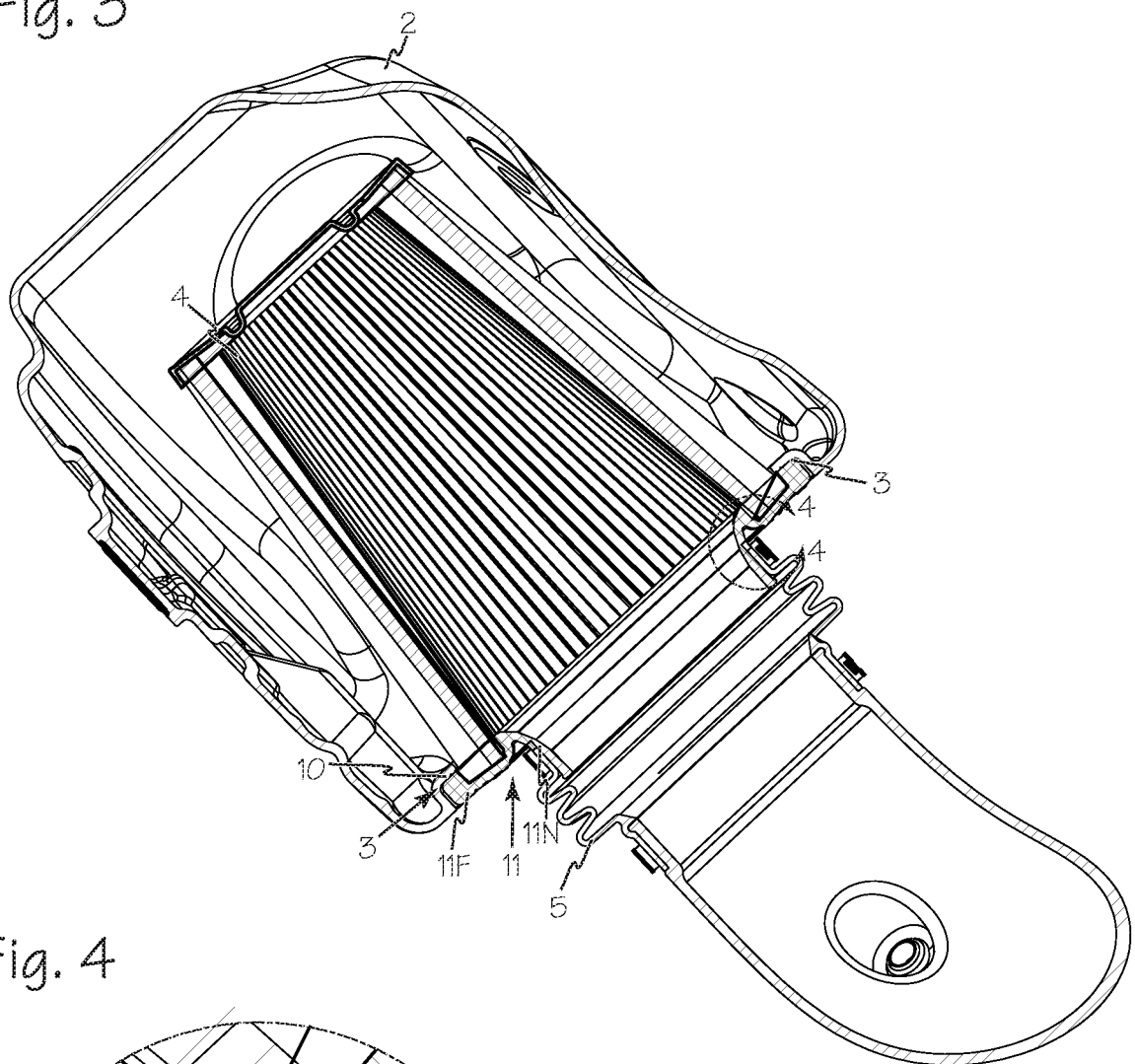
FIG. 3 is a cross-section view of the sealed intake air system of FIG. 1 taken along A-A.
Figure 4:
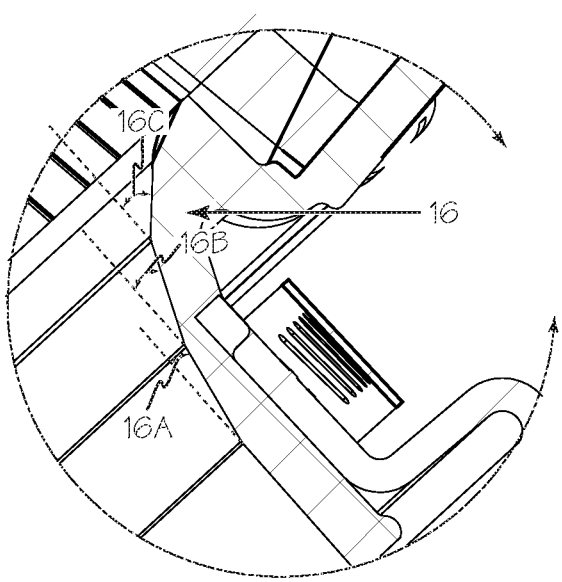
FIG. 4 is a close up of a portion of the sealed intake air system view of FIG. 3 taken along B-B

Interface 3 is illustrated in FIG. 3. Surface 10 of the airbox apposes and engaged air filter flange 11F. Optionally, one or more sealing elements 12, shown in FIG. 6, such as rubber or silicon o-rings or any other suitable seal is compressed between surface 10 and filter flange 11F and the compression is maintained by the engagement of the captive connectors 7 securing the air filter to the airbox. FIG. 4 illustrates a close-up of a portion of the air filter base 11 showing the integrated 3-angle throat or 3-angle velocity stack 16 with angles 16A, 16B and 16C in the base neck 11N.

Figure 5:
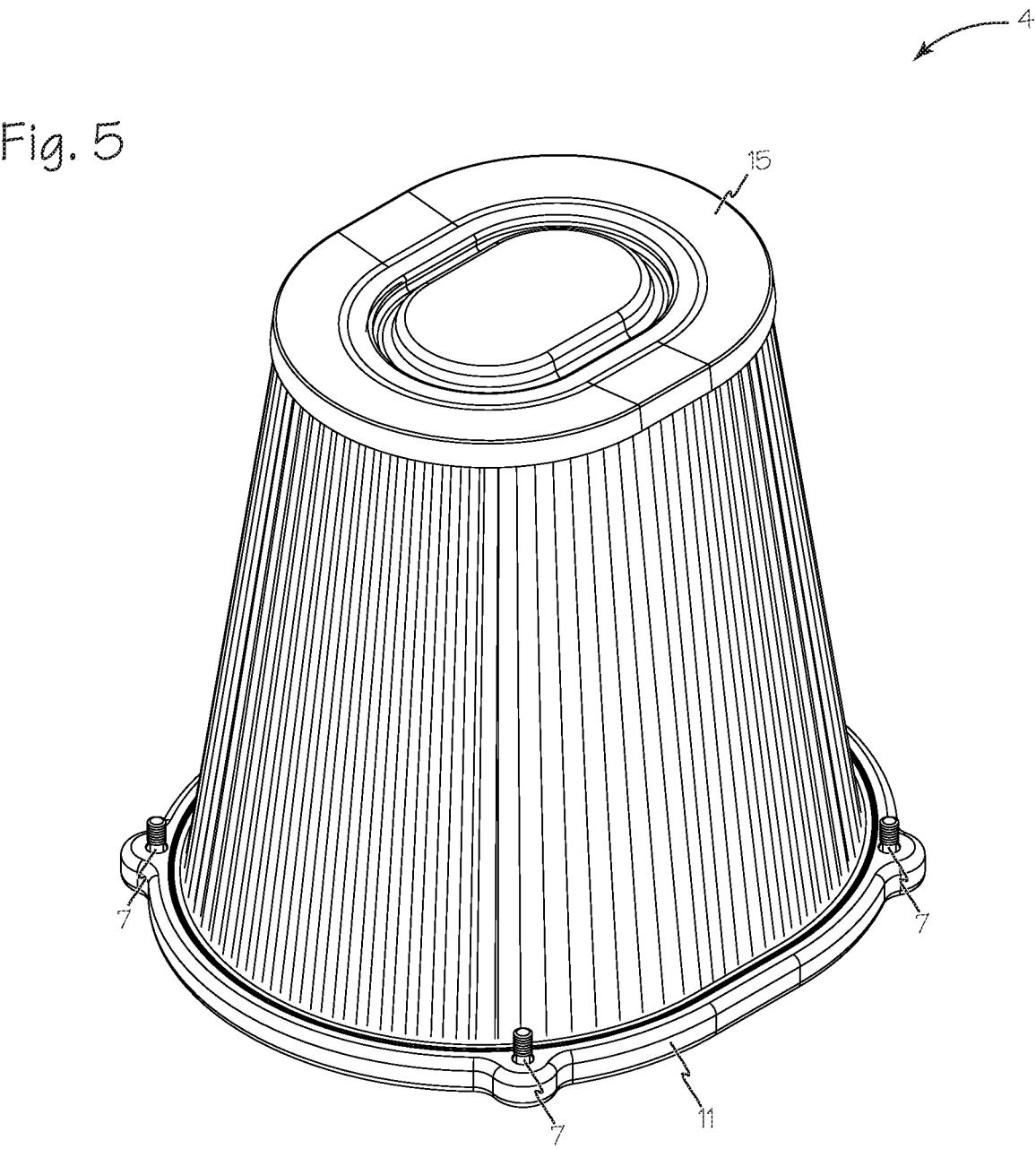
FIG. 5 is a perspective view of the air filter used in the sealed intake air system of FIG. 1.
Figure 6:
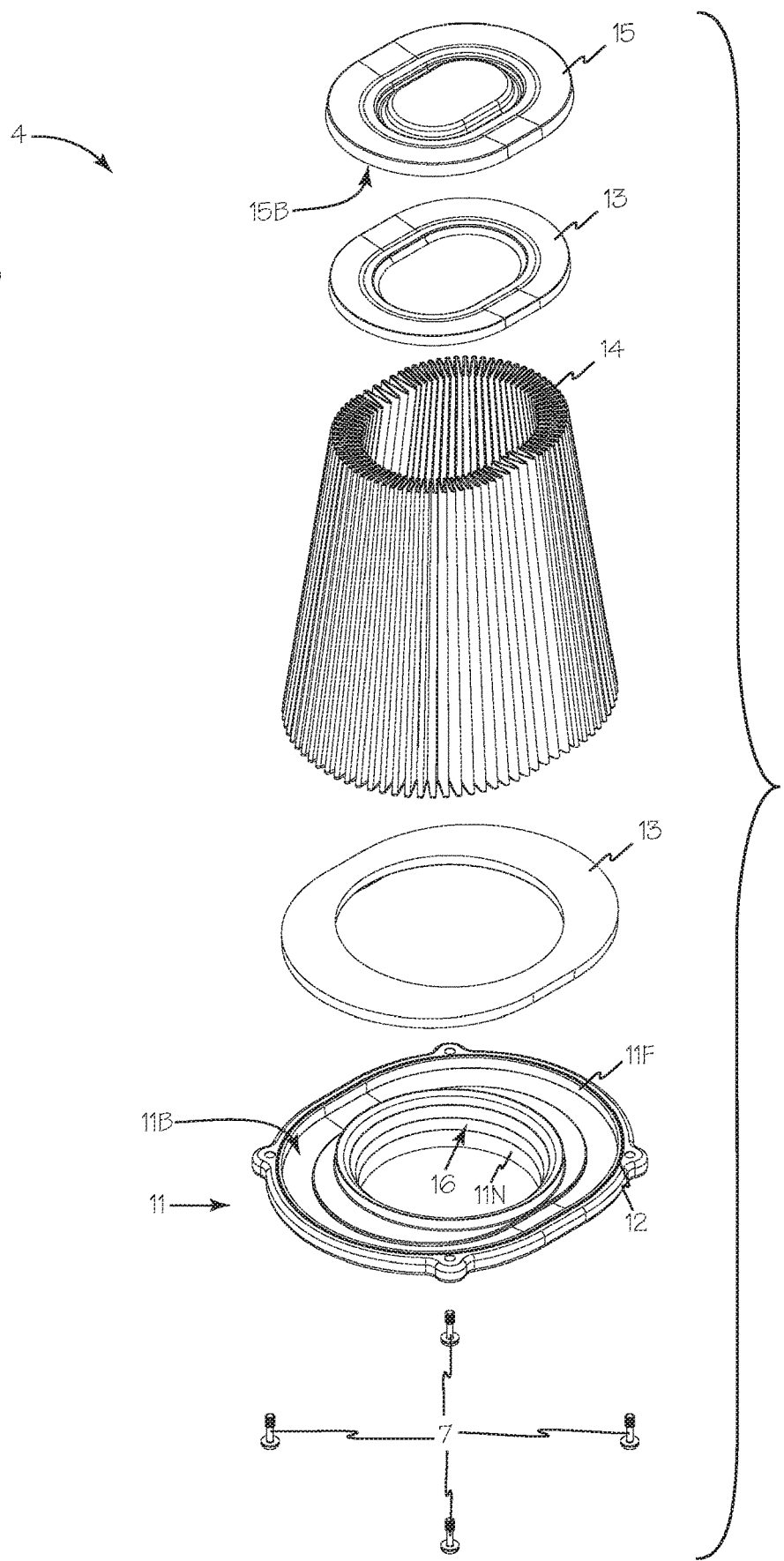
FIG. 6 is an exploded view of the air filter of FIG. 5.

Air filter 4 is illustrated in FIGS. 5 and 6. The air filter flange has an oval shape but is not limited to this geometry (it can be made to be any other shape). The plastic filter base 11 has an integrated 3-angle throat or 3-angle velocity stack 16 with angles 16A, 16B and 16C that allows smooth and even entry of air at high velocities; alternate configurations include a single angle or multiple angles, a radius of circular or elliptical form, or a combination of angles and radii. Polyurethane 13 is used to attach the filter media 14 to the plastic filter flange 11 and top 15 but other types of adhesives or mechanical bonding can be used (ie. super glue, rtv, rubber cement, resin, epoxy, etc.). The air filter base 11 and top 15 are made out of ABS but other materials can be used (including but not limited to Polyurethane, Polyethylene, aluminum, etc.). Air filter flange 11F and air filter top 15 have angled interior surfaces 11B and 15B respectively that are angled to conform to the angle of the air filter media 14. The angled surfaces 11B and 15B minimize the thickness of polyurethane seals 13 which reduces the overall weight of the air intake system.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. An intake air system comprising:
   a one-piece sealed housing airbox with an intake opening and an air filter interface;
   a rigid air filter base with a filter flange configured to engage the air filter interface in the airbox;
   a plurality of captive fasteners secured to the rigid air filter base for securing the filter flange to the airbox;

an air filter with filter media secured between the rigid air filter base and a top;
a bellows coupler operably connected to the rigid air filter base; and
an intake tube operably connected to the bellows coupler to conduct filtered air to an engine air intake;
wherein the rigid air filter base and the top each have a three-angle throat surface angled with three different angles to conform to the filter media.

2. The intake air system of claim 1 wherein the one-piece airbox includes a plurality of intake openings.

3. The intake air system of claim 1 further comprising:
a straight coupler between the bellows coupler and the rigid air filter base.

4. A intake air system comprising:
a one-piece sealed housing airbox with an intake opening and an air filter interface;
an integrated air filter base and bellows coupler wherein the integrated air filter base includes a base flange engaged to the air filter interface in the airbox;
a plurality of captive fasteners secured to the integrated base flange for securing the integrated base flange to the airbox;
an air filter with filter media secured between the integrated air filter base and a top; and
an intake tube operably connected to the bellows coupler to conduct filtered air to an engine air intake;
wherein the integrated air filter base and the top each have a three-angle throat surface angled with three different angles to conform to the filter media.

5. The intake air system of claim 4 wherein the one-piece airbox includes a plurality of intake openings.

\* \* \* \* \*